United States Patent
Alvarez Jana et al.

(10) Patent No.: US 10,904,085 B2
(45) Date of Patent: Jan. 26, 2021

(54) SYSTEMS AND METHODS FOR APPLYING A CONFIGURATION

(71) Applicant: OVH, Roubaix (FR)

(72) Inventors: Paulina Alejandra Alvarez Jana, Rennes (FR); Alexandre Henri Morignot-Desvignes, Brest (FR)

(73) Assignee: OVH, Roubaix (FR)

( * ) Notice: Subject to any disclaimer, the term of this patent is extended or adjusted under 35 U.S.C. 154(b) by 0 days.

(21) Appl. No.: 16/548,389

(22) Filed: Aug. 22, 2019

(65) Prior Publication Data

US 2020/0076690 A1 Mar. 5, 2020

(30) Foreign Application Priority Data

Aug. 30, 2018 (EP) .................................... 18315025

(51) Int. Cl.
*G06F 15/177* (2006.01)
*H04L 12/24* (2006.01)
*H04L 29/08* (2006.01)
*G06F 16/953* (2019.01)

(52) U.S. Cl.
CPC ........ *H04L 41/0813* (2013.01); *G06F 16/953* (2019.01); *H04L 67/34* (2013.01)

(58) Field of Classification Search
CPC ............. H04L 41/0869; H04L 41/0873; H04L 41/0876; H04L 41/0886; H04L 41/0893
See application file for complete search history.

(56) References Cited

U.S. PATENT DOCUMENTS

| 6,587,874 B1* | 7/2003 | Golla ...................... H04L 41/08 707/999.1 |
| 9,954,729 B1 | 4/2018 | Nolan et al. |
| 2005/0125516 A1* | 6/2005 | Molnar ................. H04L 41/082 709/223 |
| 2018/0270109 A1* | 9/2018 | Hollis ................. H04L 41/0803 |

OTHER PUBLICATIONS

European Search Report with regard to the counterpart EP Patent Application No. 18315025.9 completed Feb. 28, 2019.
User manual Arista EOS version 4.17. oF. Arista, Jun. 2016; https://www.arista.com/assets/data/docs/Manuals/EOS-4.17.0F-Manual.pdf.
Cisco Nexus 7000 Series NX-OS Security Configuration Guide; https://www.cisco.com/c/en/us/td/docs/switches/datacenter/nexus7000/sw/security/config/cisco_nexus7000_security_config_guide_8x.pdf; Cisco, First Published: Nov. 24, 2016, Last Modified: Jul. 12, 2019.

(Continued)

*Primary Examiner* — Yves Dalencourt
(74) *Attorney, Agent, or Firm* — BCF LLP

(57) ABSTRACT

Methods and systems are described for applying a configuration to networking devices. A configuration and networking device filter may be received. The networking device filter may be used to search for target networking devices. A common schema may be generated for the target networking devices. The configuration may be compared to the common schema to determine whether the configuration is valid for the target networking devices. A plurality of commands may be generated to apply the configuration to the target networking devices. The commands may be executed, thereby applying the configuration to the target networking devices.

18 Claims, 9 Drawing Sheets

(56) References Cited

OTHER PUBLICATIONS

System Security Configuration Guide for Cisco ASR 9000 Series Routers, IOS XR Release 6.5.x; https://www.cisco.com/c/en/us/td/docs/routers/asr9000/software/asr9k-r6-5/system-security/configuration/guide/b-system-security-cg-asr9000-65x.pdf; Cisco, 2019.
Software Configuration Guide, Cisco IOS Release, 15.2(2)E (Industrial Ethernet 3000 Switch); https://www.cisco.com/c/en/us/td/docs/switches/lan/cisco_ie3010/software/release/15-2_2_e/configuration/guide/SwCfg.pdf; Cisco, 2014.
A. Wright et al. JSON schema validation : A vocabulary for structural validation of json, 2017. URL http://json-schema.org/latest/json-schema-validation.html;pdf 24 pages.
OVH. CDS depot git, 2017. URL https://github.com/ovh/cds; pdf 8 pages.
OVH. OVH en savoir plus, 2017. URL https://www.ovh.com/fr/apropos/; pdf 2 pages.
OVH. OVH green it, 2017. URL https://www.ovh.com/fr/apropos/green-it.xml; pdf 3 pages.
OVH. OVH equipes, 2017. URL https://www.ovh.com/fr/apropos/equipes.xml; pdf 1 page.
Armin Ronacher. Jinja2 documentation v2.9, 2018. URL http://jinja.pocoo.orgiclocs; pdf 5 pages.
SmartBear. Swagger site web, 2017. URL https://swagger.io/; pdf 4 pages.

* cited by examiner

SYSTEMS AND METHODS FOR APPLYING A CONFIGURATION

CROSS-REFERENCE

The present application claims priority from European Patent Application No. 1 831 5025.9 filed on Aug. 30, 2018, the entirety of which is incorporated herein by reference.

FIELD

Embodiments described herein relate generally to systems and methods for managing networking devices, and more particularly, to systems and methods for applying a configuration to one or more networking devices.

BACKGROUND

Networking devices, such as routers and switches, may be used in a network to provide access to the network and/or other services. In certain instances, it may be desirable to configure and/or modify a configuration of one or more networking devices. The networking devices to be configured might use different drivers, such as different versions of drivers and/or drivers configured for different operating systems. The different drivers may have different attributes and/or different rules for configuring those attributes. It may be problematic to validate a configuration for all of the networking devices to be configured, given that the networking devices may use different operating systems and/or different drivers. The configuration may be applied without determining whether the configuration is valid for each of the networking devices, in which case errors may occur.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

The following summary is for illustrative purposes only, and is not intended to limit or constrain the detailed description. The following summary merely presents various described aspects in a simplified form as a prelude to the more detailed description provided below.

In certain instances, it may be desirable to apply a configuration to one or more networking devices, or in other words, to configure the one or more networking devices. The one or more networking devices may use one or more drivers in order to provide various services. Each of the one or more drivers may have different configurable attributes and/or different rules for the configurable attributes. The drivers may provide an interface for connecting to and configuring the networking devices.

The one or more networking devices may use different operating systems. Each operating system may use a different driver. Additionally, different versions of drivers might be implemented by the one or more networking devices, and the different versions of the drivers might each have different rules and/or different configurable attributes.

Each networking device may comprise various configurable attributes, which may be considered objects that are subject to certain rules. For example, a networking device may have one or more interfaces, virtual local area networks (VLANs), access control lists (ACLs), users, roles, and/or other configurable attributes. Each of these configurable attributes may be considered objects, i.e., an interface object, VLAN object, ACL object, user object, and role object. An object schema may be determined for each of the objects to be configured. Each object schema may indicate the configurable attributes of the object and/or the rules for the configurable attributes. For example, the object schema may indicate that the object should have a name, and the name should be a string having a pre-determined prefix. Two or more object schemas, each corresponding to different drivers, may be compared to generate a common schema applicable to all networking devices to be configured. The common schema may indicate the configurable attributes and rules that are common to objects in different drivers. If a configuration is validated using the common schema, the configuration may also be valid according to the object schemas of each of the drivers.

The common schema may be used to validate a desired configuration. If the desired configuration is found to be valid, commands may be generated to apply the configuration to the networking devices. The present configuration of each object may be compared to the desired configuration in order to determine the commands for applying the desired configuration to that object.

In one aspect, various implementations of the present technology may provide a method comprising: receiving a desired configuration for networking devices; receiving a networking device filter; determining, based on the networking device filter, a plurality of target networking devices; determining a plurality of object schemas corresponding to the plurality of target networking devices; determining, based on the plurality of object schemas, a common schema corresponding to the plurality of target networking devices; determining, based on the common schema, whether the desired configuration is valid for the plurality of target networking devices; in response to a determination that the desired configuration is valid for the plurality of target networking devices, comparing a present configuration of each networking device of the plurality of target networking devices to the desired configuration; generating a plurality of instructions for applying the desired configuration to the plurality of target networking devices; and causing the plurality of instructions to be executed, thereby applying the desired configuration to the plurality of target networking devices.

In the context of the present specification, unless expressly provided otherwise, a computer system may refer, but is not limited to, an "electronic device," an "operation system," a "system," a "computer-based system," a "controller unit," a "monitoring device," a "control device," and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and/or tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first," "second," "third," etc. have been used as adjectives only for the purpose of allowing for distinction between the nouns that they modify from one another, and not for the purpose of describing any particular relationship between those nouns.

Implementations of the present technology each may have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural or functional modifications may be made, without departing from the scope of the present disclosure.

Networks of devices, such as networks housed in a data center, may comprise a variety of different networking devices, such as routers, switches, multilayer switches, and/or other networking devices. The networking devices may service various computing devices, such as servers. In certain instances an entity operating the networking devices may wish to configure and/or modify the configuration of one or more networking devices. For example, an operator may wish to add a user to a service provided by one or more networking devices, or edit the privileges of an existing user of the services provided by the one or more networking devices.

In order to facilitate the application of the configuration to the networking devices, a configuration system may perform all or portions of the activities involved in applying the configuration. The configuration system may search for target networking devices matching a filter. The configuration system may generate a list of objects corresponding to the target networking devices. The configuration system may determine an object schema for each of the objects in the object list. The configuration system may use each of the object schemas to generate a common schema. The configuration system may use the common schema to validate the configuration.

The configuration system may compare a present configuration of each object to the desired configuration. The configuration system may determine operations for each of the networking devices in order to place each object in the desired configuration. The configuration system may cause the operations to be executed, thereby implementing the configuration.

Figure 1:
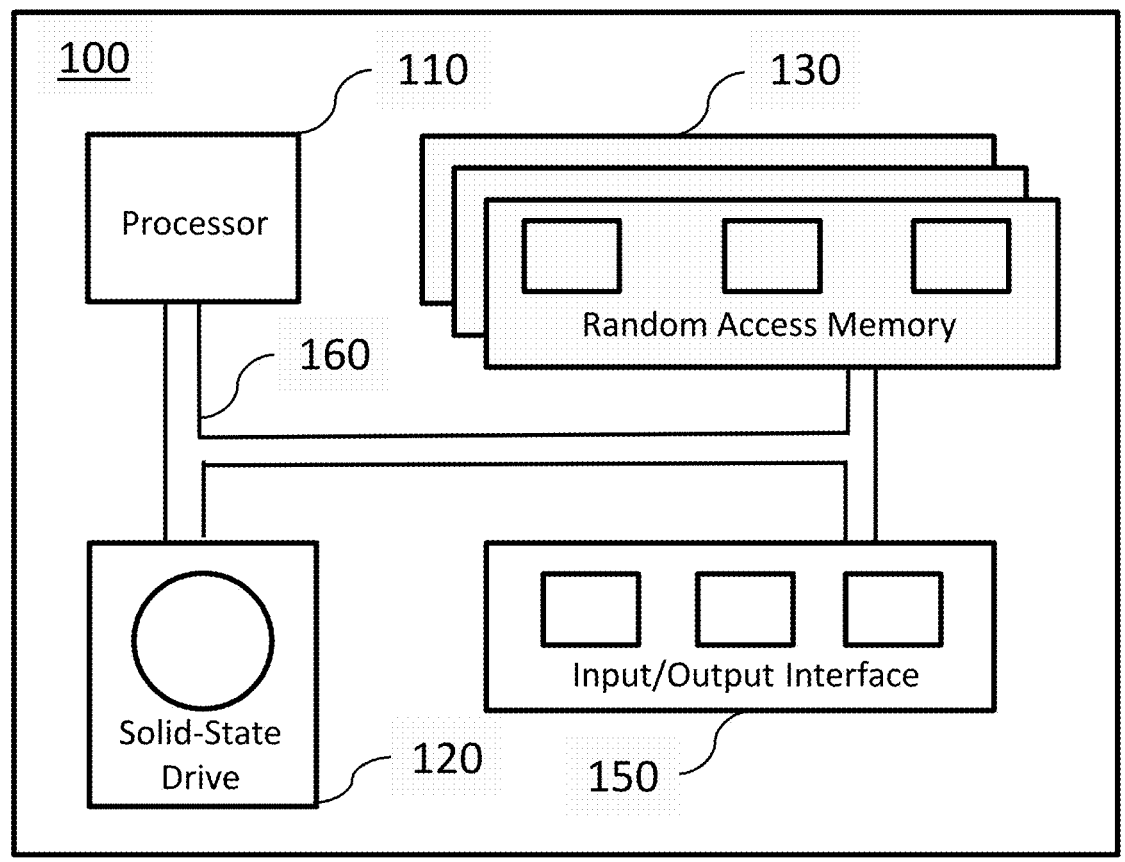
FIG. 1 shows an example computing system that may be used to implement any of the methods described herein.

FIG. 1 illustrates a diagram of a computing environment 100 in accordance with an embodiment of the present technology. In some embodiments, the computing environment 100 may be implemented by any of a conventional personal computer, a server, a router, a switch, a controller, and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a memory device, for example a random access memory 130, and an input/output interface 150. The computing environment 100 may be a computer specifically designed for operating in a data center environment. The computing environment 100 may be a generic computer system.

In some embodiments, the computing environment 100 may also be a sub-system of one of the above-listed systems. In some embodiments, the computing environment 100 may be an "off the shelf" generic computer system. In some embodiments, the computing environment 100 may be distributed amongst multiple systems. The computing environment 100 may be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may provide networking capabilities such as wired or wireless access. As an example, the input/output interface 150 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi, or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110. For example, the program instructions may be part of a library or an application. Although illustrated as a solid-state drive 120, any type of memory may be used in place of the solid-state drive 120, such as a hard disk, optical disk, and/or removable storage media.

Figure 2:
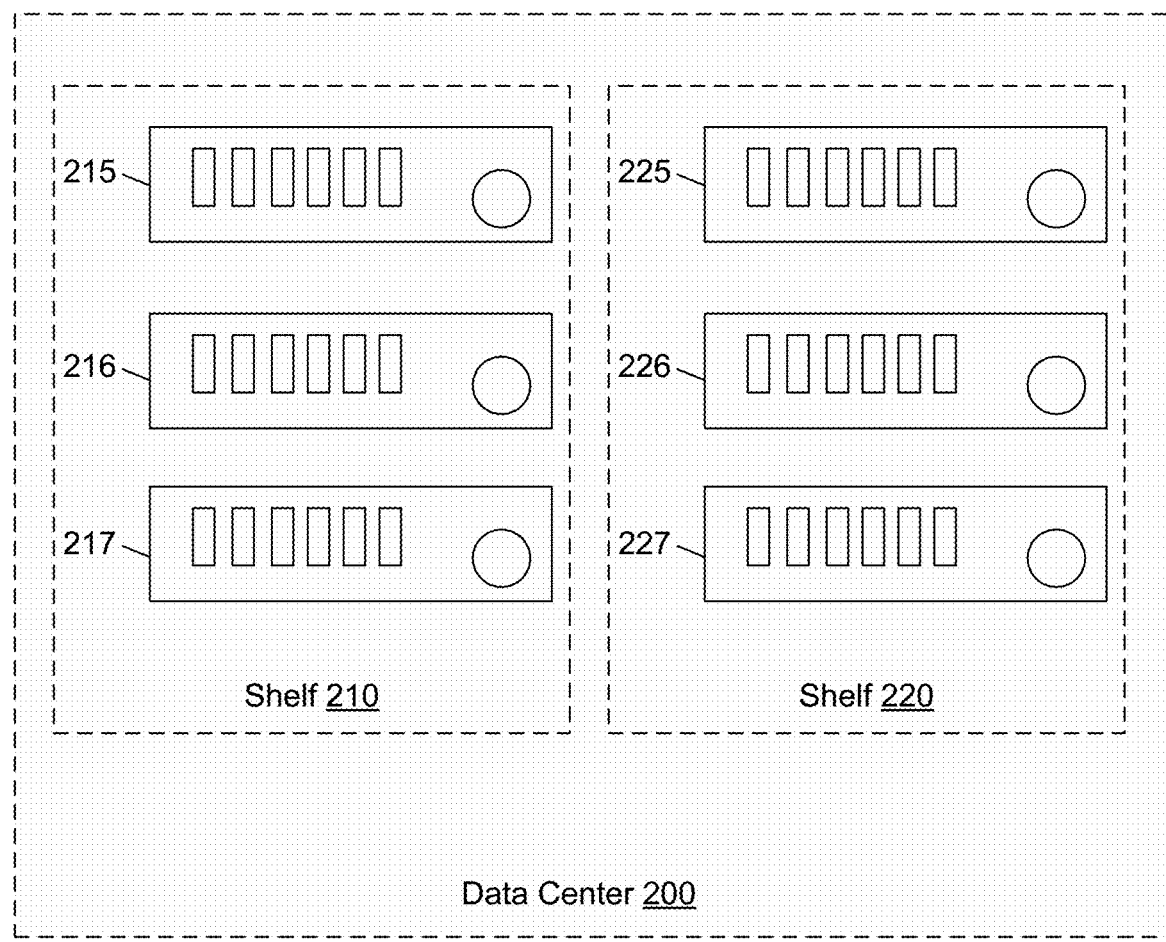
FIG. 2 shows an example of networking devices according to one or more illustrative aspects of the disclosure.

FIG. 2 shows an example of networking devices according to one or more illustrative aspects of the disclosure. A data center 200 may comprise a plurality of networking devices, servers, and/or other devices. Devices in the data center may be stored on one or more shelves, such as shelves 210 and 220. Networking devices 215-17 may be located on shelf 210, and networking devices 225-27 may be located on shelf 220. Networking devices 215-17 and 225-27 may be any type of networking devices, such as routers, switches, etc. Although illustrated as being located in one data center 200, the networking devices 215-17 and 225-27 may be located in different physical locations, such as in different data centers. Each of the networking devices 215-17 and 225-27 may use one or more operating systems, such as Arista EOS®, Cisco NX-OS, Cisco IOS®, Cisco IOS-XR, and/or any other operating system. For example networking device 215 may use Arista EOS®, networking device 216 may use Cisco NX-OS, and networking device 217 may use Cisco IOS®.

Each of the networking devices 215-17 and 225-27 may be identified by a name, key, location, path, and/or any other identifier. For example each of the networking devices 215-17 and 225-27 may be assigned a different name. The path may comprise an indication of a shelf. For example the path of the networking device 215 may comprise an indication of the shelf 210 on which the networking device 215 is located.

Each of the networking devices 215-17 and 225-27 may comprise one or more drivers. The drivers may provide one or more services, such as virtual routing and forwarding (VRF) or VLAN. The driver for a networking device may be configured for the operating system used by the networking device. Each driver may be configured to operate with one or more types and/or versions of operating systems. Each driver may indicate one or more ways for communicating with a networking device corresponding to the driver. For example the networking devices 215-17 and 225-27 may be configured via command-line interface, secure shell (SSH), NX-API, eAPI, and/or any other interface for communicating with a networking device.

An operator of the devices 215-17 and 225-27 may wish to configure and/or modify the configuration of one or more of the services provided by the networking devices 215-17 and 225-27. These services may be provided by the drivers of the devices 215-17 and 225-27. The drivers may define the way to connect to the networking devices 215-17 and 225-27 to configure the services and/or how to perform the configuration.

Figure 3:
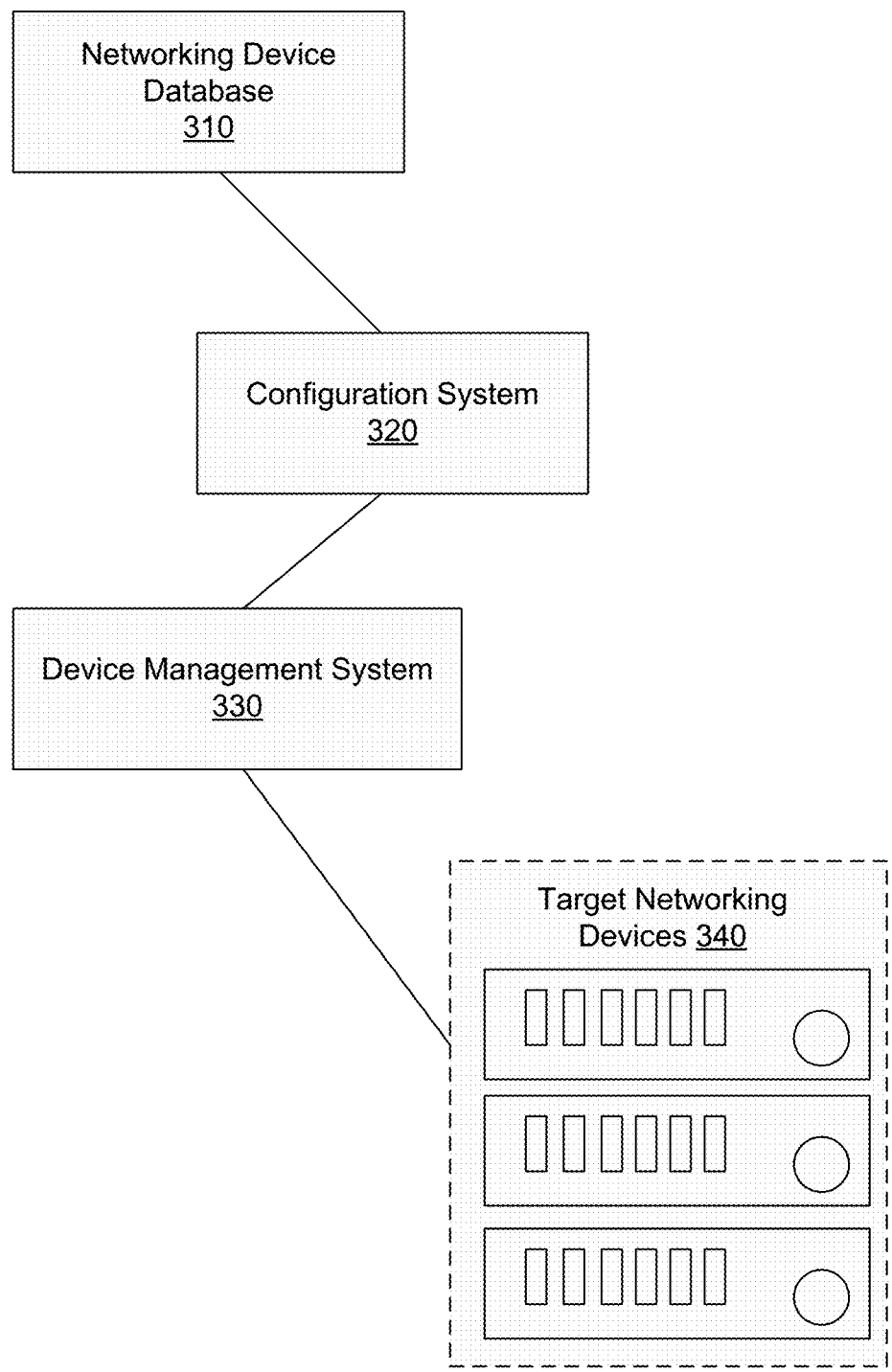
FIG. 3 shows an example of a configuration environment according to one or more illustrative aspects of the disclosure.

FIG. 3 shows an example of a configuration environment according to one or more illustrative aspects of the disclosure. A configuration system 320 may be used to apply a configuration to one or more target networking devices 340. The configuration system 320 may receive, as an input, a networking device filter and/or a desired configuration. The networking device filter may comprise one or more criteria for networking devices, such as a model type. A search may be performed to find target networking devices 340 that satisfy the networking device filter.

The networking device database 310 may comprise information about one or more networking devices. The networking device database 310 may indicate, for each networking device, one or more names, locations, addresses, configurations, model number, model type, operating system, services provided, drivers, driver versions, and/or other information corresponding to each networking device. The networking device database 310 may comprise information about networking devices within one physical location, such as a data center, or within multiple physical locations, such as multiple data centers. The networking device database 310 may receive an update each time changes are made to the networking devices represented within the networking device database 310. For example, if a configuration of a networking device is changed, the updated configuration may be stored in the networking device database 310.

The configuration system 320 may search the networking device database 310 for target networking devices 340 that satisfy the networking device filter. The configuration system 320 may compare a present configuration of the target networking devices 340 to a desired configuration. The present configuration of the target networking devices 340 may be retrieved from the networking device database 310. The configuration system 320 may generate one or more instructions for applying the desired configuration to the target networking devices 340. The generated instructions may be transmitted to a device management system 330.

The device management system 330 may communicate with the target networking devices 340. The device management system 330 may receive one or more commands from the configuration system 320 and apply the one or more commands to the target networking devices 340. The device management system 330 may receive commands from the configuration system 320 in a first format, and convert those commands into a second format corresponding to a target networking device 340. The device management system 330 may transmit the commands, in the second format, to one or more target networking devices 340. The device management system 330 may cause the instruction to be executed by one or more target networking devices 340.

Although FIG. 3 illustrates a specific arrangement of devices for applying a configuration to one or more networking devices, one of skill in the art will appreciate that other arrangements may be used. For example the configuration system 320 may apply the configuration directly to the target networking devices 340. In another example, rather than searching the networking device database 310 for the target networking devices 340, the configuration system 320 may poll networking devices to find the target networking devices 340 that satisfy the networking device filter.

Figure 4:
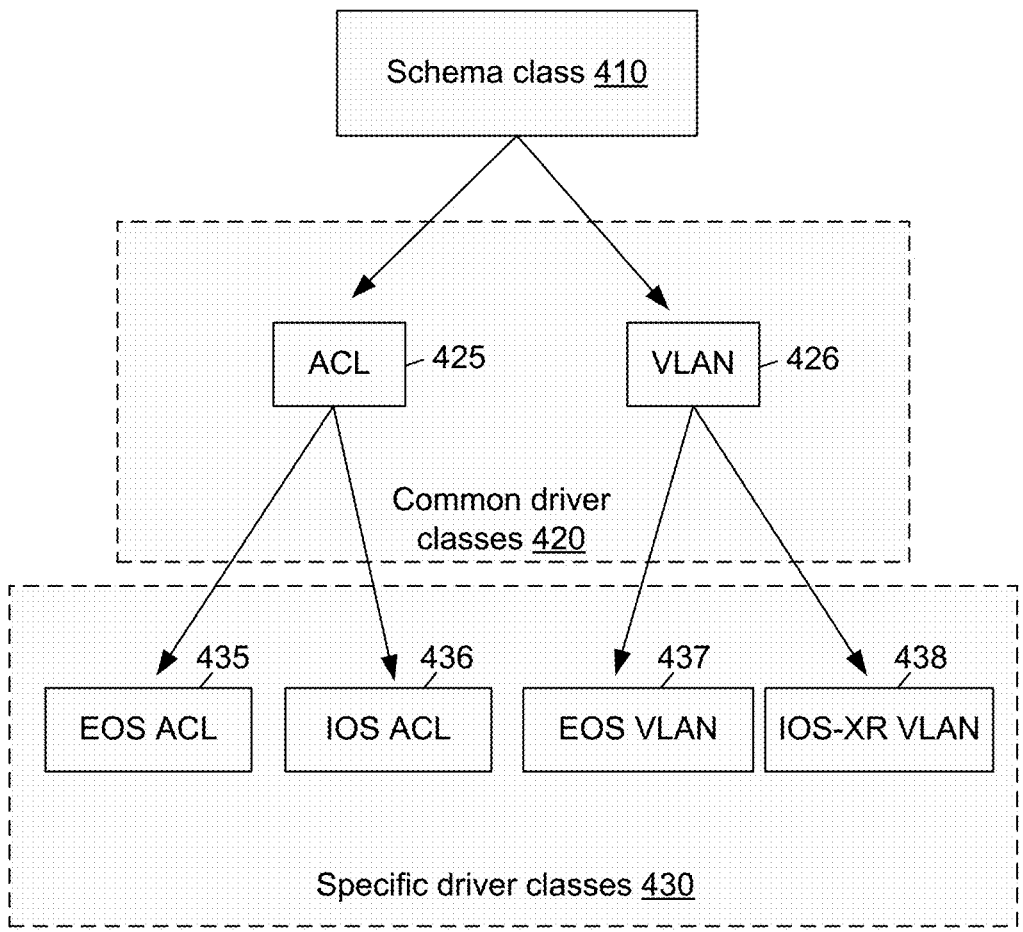
FIG. 4 shows an example of object classes according to one or more illustrative aspects of the disclosure.
Figure 5A:
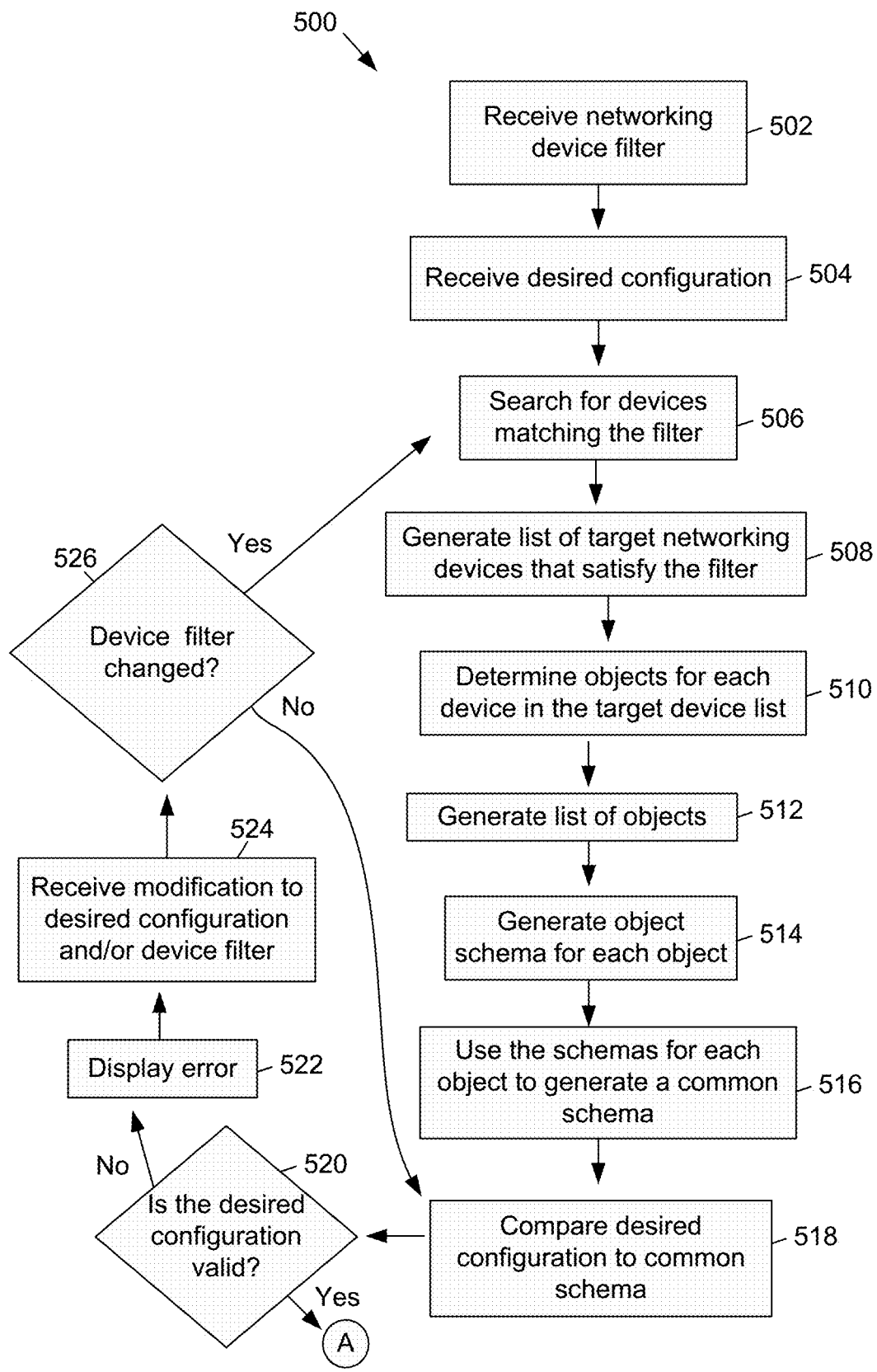
FIGS. 5A-D are a flow diagram of a method for applying a configuration according to one or more illustrative aspects of the disclosure.
Figure 5B:
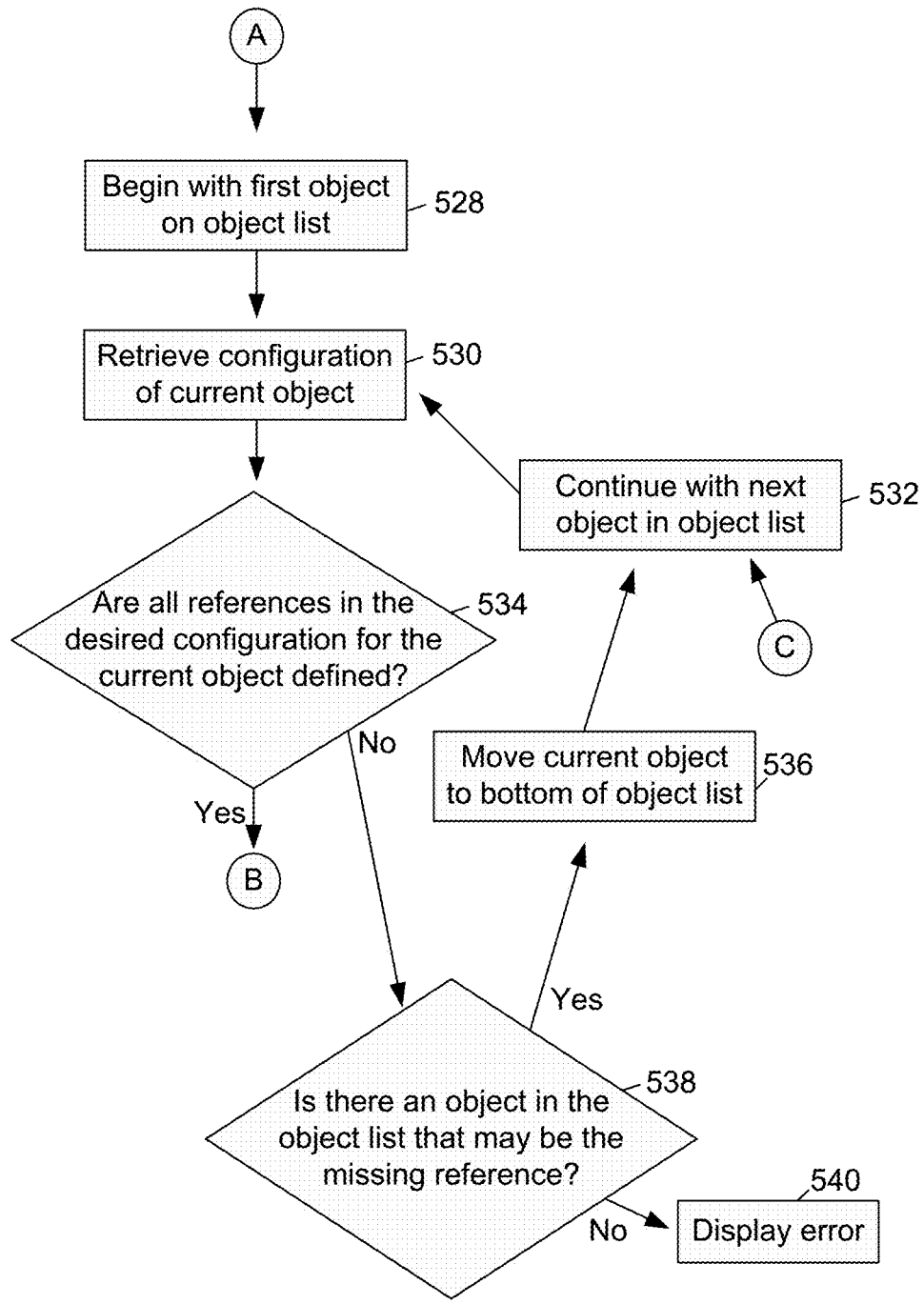
Figure 5C:
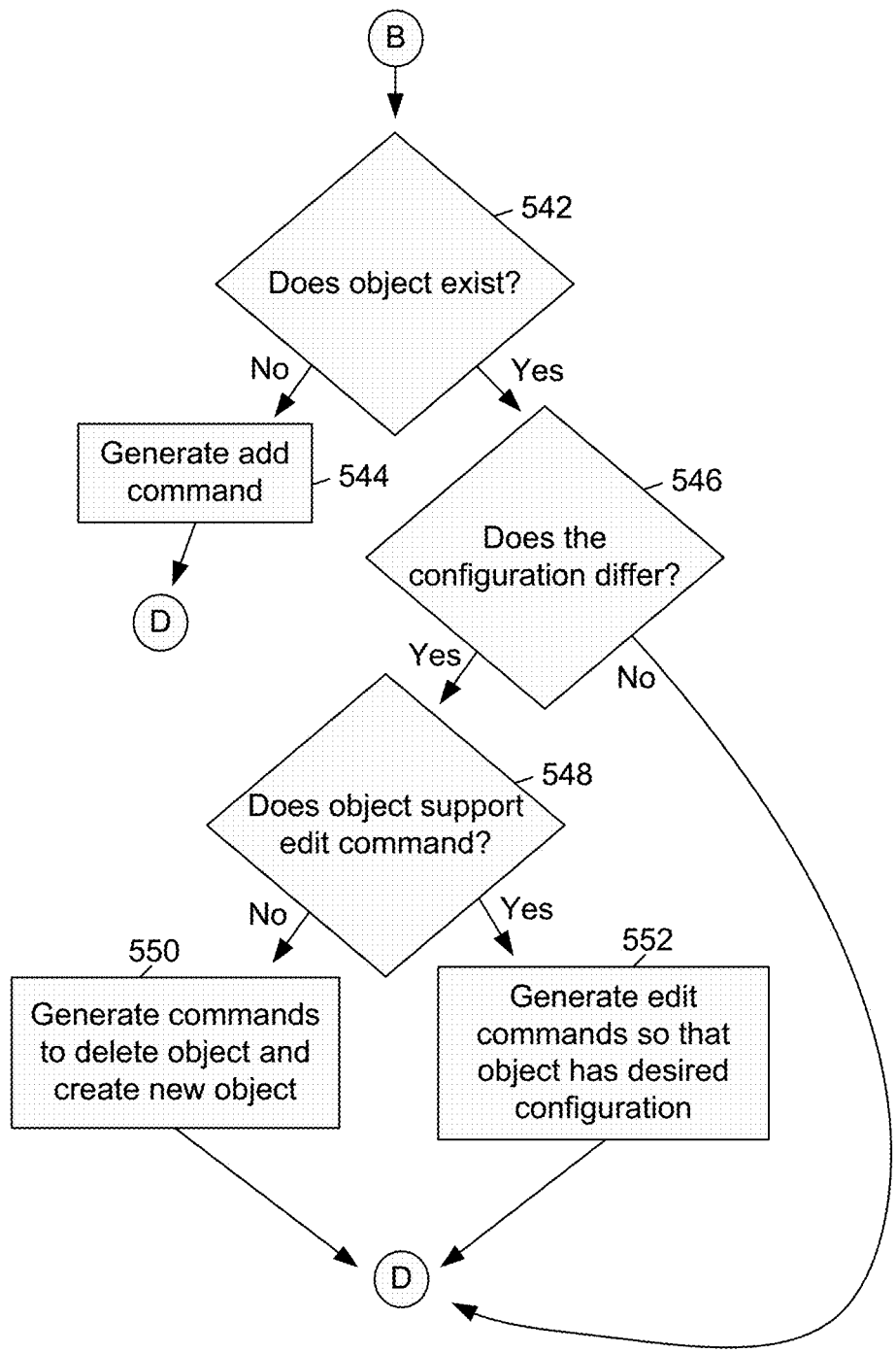
Figure 5D:
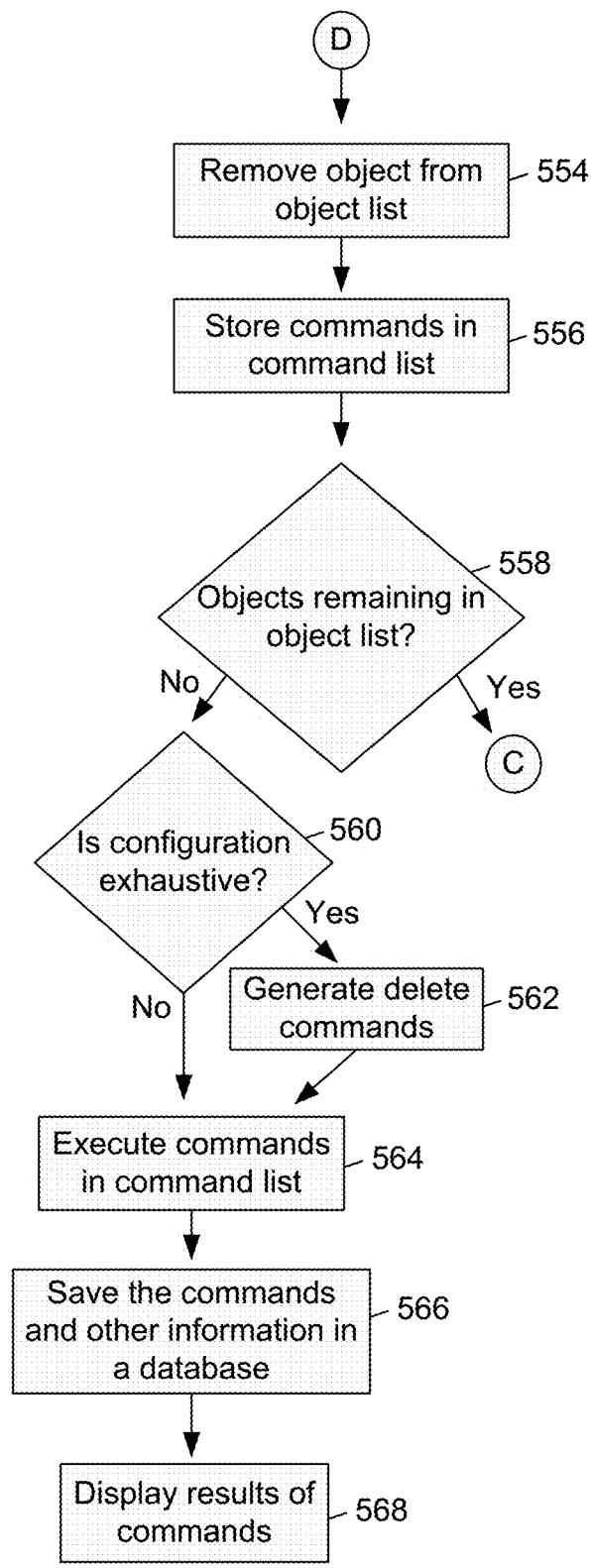

FIG. 4 shows an example of object classes according to one or more illustrative aspects of the disclosure. As described above, networking devices, such as the networking devices 215-17 and 225-27, may comprise one or more drivers. Each of the networking device 215-17 and 225-27 may provide one or more services, which may be configurable via the drivers. The configurable attributes of the networking devices 215-17 and 225-27 may be represented by objects, such as a VLAN object, an ACL object, etc.

Information about objects may be stored in a hierarchical set of classes, in which each child class inherits the functionality of their parent classes. The classes may comprise an indication of one or more attributes of the object, such as configurable attributes. The classes may comprise one or more rules for the configurable attributes. The classes may comprise one or more functions. The classes may be implemented in any format, such as Python™ or Java™.

The schema class 410 may comprise a function for generating a schema. The generated schema may comprise one or more rules corresponding to the driver that the object represents. If a configuration is valid according to the schema for an object, the configuration may be valid for the driver and/or networking device corresponding to that object. A configuration that is valid for a driver may be applied to the networking device, via the driver, without causing any errors. A valid configuration may set configurable attributes of the networking device within the predetermined boundaries corresponding to the driver. The schema class may comprise various attributes, such as a name attribute and/or a location attribute.

The schema class 410 may have one or more children, such as common driver classes 420 which may inherit the schema generation function of the schema class 410, and/or any other functions or attributes defined in the schema class 410. The common driver classes 420 may correspond to a type of object. For example the ACL common driver class 425 may correspond to ACL objects. The common driver classes 420 may comprise rules that apply to that type of object for all drivers, regardless of what operating system the driver corresponds to or the version of the driver. For example, if all VLAN objects have a VLAN name attribute, the VLAN common driver class 426 may comprise a VLAN name attribute.

Although the common driver classes 420 are described as applying to all drivers of a specified type, the driver classes 420 may apply to all of the drivers of that type used by an entity and/or used in a location. For example the VLAN common driver class 426 may comprise attributes and rules applicable to all VLAN drivers used by an entity. In another example the ACL common driver class 425 may comprise attributes and rules applicable to all ACL drivers used in a specific data center.

The schema generation function of each common driver class 420 may generate a schema comprising rules for configuring a driver corresponding to that class. For example the VLAN common driver class 426 may generate a schema comprising one or more rules for configuring a VLAN. In this example, the rules in the schema may be applicable to any networking device, regardless of which operating system the networking device corresponds to or which driver version the networking device uses. In other words, a configuration validated by a schema generated by the VLAN common driver class 426 may be valid for any networking device.

Specific driver classes 430 may inherit the functions and attributes of their parent classes, the common driver classes 420, which may include the functions and attributes of the schema class 410. For example the EOS ACL class 435 and IOS ACL class 436 may inherit the functions and attributes of the ACL common driver class 425, and the EOS VLAN class 437 and IOS-XR VLAN class 438 may inherit the attributes of the VLAN common driver class 426.

Each of the specific driver classes 430 may comprise a function for generating an object schema corresponding to that class. The schema generation function of the specific driver classes 430 may be inherited from the schema class 410. The schema generation function of each specific driver class 430 may generate an object schema comprising rules for configuring a networking device corresponding to that class. For example the EOS VLAN class 437 may generate an object schema comprising one or more rules for configuring the VLAN of a networking device using an EOS operating system and corresponding driver.

Although FIG. 4 illustrates various exemplary classes, any amount and/or type of classes may be used, and any amount of levels of classes may be used. For example, one or more classes may be children of a specific driver class 430, and may inherit attributes from the specific driver class 430.

FIGS. 5A-D are a flow diagram of a method 500 for applying a configuration according to one or more illustrative aspects of the disclosure. In one or more embodiments, the method 500 or one or more steps thereof may be performed by one or more computing devices or entities. Without limitation, all or portions of the method 500 may be executed by the configuration system 320 and device management system 330. For example, steps 502-62, 566, and 568 may be performed by the configuration system 320, and step 564 may be performed by the device management system 330. Portions of the method 500 may be performed by components of the computing device 100. The method 500 or one or more steps thereof may be embodied in computer-executable instructions that are stored in a computer-readable medium, such as a non-transitory computer-readable medium. Some steps or portions of steps in the flow diagram may be omitted or changed in order.

At step 502 a networking device filter may be received. The networking device filter may be received by a computing device 100, such as the configuration system 320. The networking device filter may indicate one or more rules to be used for searching for networking devices. The networking device filter may comprise any rules for searching for networking devices, such as an indication of: networking device name, type of networking device, version of networking device, location of networking device, status of networking device, any other identifying information corresponding to networking devices, and/or any combination thereof. The networking device filter may comprise a pattern, such as a pattern for a networking device name. The networking device filter may comprise a plurality of rules.

At step 504 a desired configuration may be received. The desired configuration may be received by a computing device 100, such as the configuration system 320. The desired configuration may be a configuration that is intended to be applied to networking devices that satisfy the networking device filter received at step 502. The desired configuration may comprise changes to an existing network configuration, a new networking configuration, or a combination of both. The desired configuration may be received in any suitable format, such as in a JavaScript object notation (JSON) format.

The desired configuration may comprise values for any configurable attribute of the networking devices. The desired configuration may comprise a configuration for users, roles, VLANs, ACL, VRF, interfaces, and/or any other configurable attribute of a networking device. For example the desired configuration may add or remove a user, configure a VLAN, change user privileges, and/or configure any other aspect of the networking devices. The desired configuration may indicate whether the configuration is exhaustive or not exhaustive. If the configuration is exhaustive, elements in the present configuration that are not in the desired configuration may be deleted. The received configuration may comprise a name for the configuration.

At step 506 a search may be performed for networking devices satisfying the networking device filter received at step 502. As described above in regards to FIG. 3, a database, such as the networking device database 310, may be searched for networking devices satisfying the networking device filter. One or more queries may be generated based on the networking device filter and used to search the database.

One or more data centers may be scanned for networking devices satisfying the filter. A database comprising information about one or more data centers, such as the networking device database 310, may be searched for networking devices that satisfy the filter. The results of the search for networking devices that satisfy the networking device filter may be described as target networking devices. In other words the target networking devices may be networking devices to be configured using the received configuration.

At step 508 a list of the target networking devices found at step 506 may be generated and/or stored. The list may comprise identifying information for each target networking device, such as a name, primary key, serial number, MAC address, and/or any other identifying information.

Rather than receiving a networking device filter at step 502, the list of target networking devices may be received at step 502. In that case, steps 506 and 508 may be skipped.

At step 510 objects may be identified for the networking devices in the networking device list. For each networking device in the networking device list, the drivers associated with that networking device may be determined. A database, such as the networking device database 310, may store information indicating the drivers used by various networking device. The database may be queried to determine which drivers are in use by each networking device.

The networking devices in the networking device list may be polled to determine which drivers they are using. For each driver, a version of the driver may be determined, an operating system of the driver may be determined, and/or other information regarding the driver may be determined. Once the drivers have been identified, corresponding objects may be determined. The objects may comprise various specific driver classes 430. For each driver, the version and/or operating system corresponding to the driver may be used to determine one or more objects corresponding to that driver. One or more objects may be determined for each networking device in the networking device list. For example, for one networking device, an EOS ACL class 435 and an EOS VLAN class 437 may be determined to be objects corresponding to that networking device.

At step 512 a list of objects may be generated. The list of objects may comprise each object identified at step 510. The list of objects may comprise an identifier for each object. Each object may comprise a key that identifies the object. Each object may comprise an indication of one or more parent objects from which the object inherits rules and/or attributes.

At step 514 an object schema may be generated for each object in the object list. As described above in regards to FIG. 4, the class corresponding to each object may comprise a function for generating an object schema. The object schema may comprise a series of attributes and/or rules corresponding to the driver represented by the object. For example for an object corresponding to a VLAN, the object schema may indicate that the name of the VLAN should be a string having between 10 and 15 characters. The object schema may indicate one or more attributes of the object that cannot be null, and/or one or more attributes of the object that can be null (i.e. can have no given value).

The generated object schemas may be in a JSON format, or any other suitable format. The generated object schemas may be in a same format as the configuration received at step 504, or in a format compatible with the format of the configuration received at step 504. The generated object schemas may be applied to, or compared to, the configuration received at step 504 to determine whether the configuration is valid for the object corresponding to the object schema. Each object schema may be used to determine whether a configuration is valid for the networking device corresponding to the object schema.

At step 516 a common schema may be generated. The common schema may comprise a schema that indicates whether a configuration is valid for all of the target networking devices. The common schema may indicate rules and attributes that are shared by each of the target networking devices. In other words, the common schema may indicate rules and attributes that are shared by each of the drivers of the target networking devices. The common schema may be in a same format as the configuration received at step 504 and/or the object schemas.

The object schemas for each object in the object list may be used to generate the common schema. The common schema may comprise one schema with attributes in common for each of the object schemas. For example, a first object schema may indicate that a username must be between 10 and 20 characters long and must include at least one number and at least one letter, and a second object schema may indicate that a username must be between 12 and 14 characters long and may contain any characters. In this example the common schema may indicate that the username must be between 12 and 14 characters long and contain at least one number and at least one letter.

The common schema may comprise a set of instructions, or rules, that would be valid for each of the object schemas. A configuration being validated by the common schema may indicate that the configuration is valid for each of the individual object schemas for the target networking devices. To generate the common schema, a function may iterate through each object schema, and the common schema may be adjusted based on each object schema. For example if, while iterating through the object schemas, the common schema comprises an attribute that is not present in an object schema, that attribute may be removed from the common schema.

At step 518 the desired configuration received at step 504 may be compared to the common schema to determine whether the configuration is valid for each of the target networking devices. The common schema may be applied to the desired configuration to determine whether the desired configuration is valid for the target networking devices. Each element of the configuration may be compared to the common schema to determine whether that element is valid for each of the target networking devices.

The results of the comparison may comprise a prediction of whether applying the desired configuration to the target networking devices would cause any errors. If the desired configuration is valid according to the common schema, the desired configuration may be applied to the target networking devices without causing any predicted errors. If the desired configuration is invalid, applying the configuration to the target networking devices may be predicted to cause one or more errors.

At step 520 the results of the comparison may be used to determine whether the configuration is valid for the target networking devices. If the common schema does not validate the configuration, an error may be displayed at step 522. The error may be displayed via a user interface. The error may indicate which portion of the configuration was not validated, such as one or more settings in the configuration that were not valid for each of the objects. The error may indicate which rule or rules in the common schema were violated by the configuration. The error may indicate which networking device and/or which drivers caused the error, i.e. which networking devices and/or drivers would not accept the configuration.

At step 524 a modification to the configuration and/or the equipment filter may be received. Although described as a modification, a replacement configuration and/or equipment filter may be received. The modification may comprise one or more changes to the configuration. The modification may comprise changes to the portions of the configuration that were not validated according to the common schema.

The modification may comprise a modified networking device filter and/or a modified list of target networking devices. The modification may comprise an addition and/or removal of one or more networking devices from the list target networking devices. For example, a networking device that was causing the configuration to not be validated may be removed from the list of target networking devices.

At step 526 a determination of whether any changes to the networking device filter and/or list of target networking devices were made. If the networking device filter was modified, networking devices satisfying the filter may be determined at step 506. If the networking device filter was not modified, but the configuration was modified, the modified configuration may be compared to the common schema at step 518. Although not illustrated in the figure, if the networking device filter was not modified, but the list of target networking devices was modified, objects may be determined for the devices in the updated target networking device list at step 510.

Once a valid configuration is determined for the target networking devices at step 520, at step 528 the application of the desired configuration to objects may begin with a first object on the object list. The objects may be arranged in the list in any order. For example the objects may be arranged based on where the networking devices corresponding to the objects are located. The object list may be traversed in any order.

At step 530 a present configuration of the current object may be determined. The present configuration may be determined from a database, such as the networking device database 310, determined from the networking device corresponding to the object, and/or otherwise determined. Initially, the current object is the first object in the object list. In the following steps, the present configuration may be compared to the desired configuration. If the present configuration of the object matches the desired configuration, the object may be left unchanged and the next object on the object list may be selected at step 532 and then the configuration of that next object may be retrieved at step 530.

A determination may be made at step 534 as to whether all references in the desired configuration for the current object have been defined in the desired configuration and/or in the present configuration of the target networking devices. The references may comprise users, roles, VLANs, interfaces, and/or any other objects. If a reference has not yet been defined, the application of the configuration to the object might be delayed, until after the reference has been defined.

A database, such as the networking device database 310, may be used to determine whether the references in the desired configuration are defined in the present configuration of the target networking devices. To determine whether the references have been defined, the networking device database 310 may be searched, or queried, for the references. If the references are present in the networking device database 310 then they may have previously been defined.

If any references are not defined in the present configuration or desired configuration, a determination may be made at step 538 as to whether there is an object or objects in the list of objects that may comprise the missing reference or references. If, at step 538, it is determined that there is an object or objects in the list of objects that may comprise the missing reference or references, the current object may be moved to the bottom of the object list at step 536. The next object in the object list may then be selected at step 532. By moving the object to the bottom of the object list, the application of the configuration to that object may be delayed. Commands may be generated for the object later, once the references have been defined.

If, at step 538, it is determined that there might not be an object or objects in the object list that comprises the missing reference or references, an error may be displayed at step 540. The error may indicate which references were not defined. Various steps may be taken to resolve the error. A modified or new configuration may be received and/or a modified or new networking device filter may be received, at which point the method 500 may continue at step 506.

Otherwise, if all references are determined at step 534 to be defined, the desired configuration may be applied to each of the objects in the object list. The desired configuration may be applied to each of the objects in an iterative fashion, i.e. one after another, simultaneously, or in any other order or method. For example two or more functions may operate in parallel to apply the desired configuration to each object.

At step 542 a determination may be made as to whether the object is presently defined. A database, such as the networking device database 310, may be used to determine whether the object is defined in the present configuration of the target networking devices. If the object does not exist, add commands may be generated at step 544 to create the object. The generated add commands may comprise one or more commands to create the object. The generated add commands may comprise one or more commands to configure the object according to the desired configuration.

If it is determined at step 542 that the object is defined, the present configuration of the object may be compared to the desired configuration. If the present configuration of the object is different from the desired configuration, at step 548 a determination may be made as to whether the object can be edited, i.e., does the driver corresponding to the object support an edit command. If the object can be edited, at step 552 one or more edit commands may be generated to place the object in the desired configuration. The present configuration of the object may be compared to the desired configuration to generate the edit commands.

If a determination is made at step 548 that the object does not support edit commands, at step 550 commands may be generated to delete the object and add a new object with the desired configuration. After commands have been generated for an object at either steps 544, 550, or 552, or if it is determined at step 546 that the object is already in the desired configuration, the object may be removed from the object list at step 554.

The commands generated at steps 544, 550, and/or 552 may comprise add commands, edit commands, and/or delete commands. The commands may comprise a reference, a path, a shelf, a payload, and/or other configuration instructions.

The generated commands may be stored in a command list at step 556. The command list may comprise a list of commands for configuring networking devices. The generated commands may be stored in a list, database, and/or any other storage unit.

At step 558, a determination may be made as to whether objects remain in the object list. If objects remain in the list, the next object in the object list may be selected at step 532, and commands corresponding to that next object may be generated. Once the object list is empty, i.e. there are no more objects to generate commands for, at step 560 a determination may be made as to whether the desired configuration is exhaustive or not. The desired configuration received at step 504 may indicate whether the desired configuration is exhaustive. A user input may be received indicating whether the desired configuration is exhaustive.

If the desired configuration is determined to be exhaustive, at step 562 one or more delete commands may be generated for each object that is defined in the present configuration but not defined in the desired configuration. The one or more delete commands may be stored in the command list.

If the configuration is determined to not be exhaustive at step 560, or after the delete commands have been generated at step 562, the commands in the command list may be executed. The one or more commands may be transmitted to a service that may execute the one or more commands, such as the device management system 330. The commands may be transmitted directly to the target networking devices 340. The one or more commands may be executed in order to apply the desired configuration to the target networking devices 340.

The one or more commands in the command list may be executed in any order. An order for executing the commands may be determined. The commands may be ordered in such a way as to avoid errors, such as errors caused by references. The order of execution of commands may be based on object dependency. Commands for an object that reference one or more other objects may be executed after the commands for the one or more other objects. For example, if a first object references a second object, commands corresponding to the second object may be executed prior to commands corresponding to the first object.

At step 566 the executed commands may be stored, such as in a database. For example, the networking device database 310 may be updated to indicate that the target networking devices have been configured according to the desired configuration. Other information may be stored in the database, such as the results of executing each command, the list of objects, the prior configuration of each object, the networking device filter, the configuration, and/or any other data related to applying the configuration. The stored information may permit all or a portion of the changes made by executing the commands to be rolled-back, so that all or a portion of the objects are returned to the state that they were in prior to applying the configuration.

At step 568 the results of executing the commands may be displayed. The results may be displayed in a user interface. The results may indicate whether each command was executed successfully or failed. The results may indicate any errors that occurred while executing the commands. The results may indicate that all commands were successfully executed.

After executing the commands, the target networking devices may be configured according to the desired configuration. Further configurations may then be applied.

Figure 6:
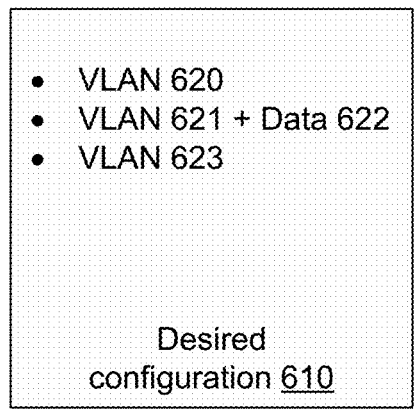
FIG. 6 shows an example of a configuration according to one or more illustrative aspects of the disclosure.
Figure 6:
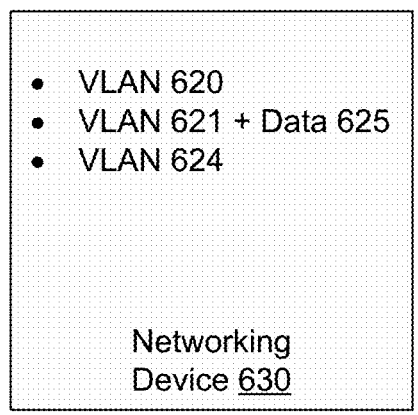

FIG. 6 shows an example of a configuration according to one or more illustrative aspects of the disclosure. FIG. 6 illustrates a desired configuration 610 and the present configuration of a networking device 630, which may be an instance of a target networking device 340. The method 500 may be used to apply the desired configuration 610 to the networking device 630.

The desired configuration 610 may be compared to the present configuration of the networking device 630 to determine the commands to be applied to the networking device 630. The desired configuration may comprise a VLAN 620, a VLAN 621 with data 622, and a VLAN 623. The present configuration of the networking device 630 may comprise the VLAN 620, the VLAN 621 with data 625, and a VLAN 624.

If the networking device 630 supports the edit command, and the desired configuration 610 is not exhaustive, one command may be generated to edit VLAN 621 with data 622 and another command may be generated to create VLAN 623. The result of executing these commands may be an object having the VLAN 620, the VLAN 621 with data 622, the VLAN 623, and the VLAN 624.

If the configuration is exhaustive, a first command may be generated to edit VLAN 621 with data 622, a second command may be generated to create the VLAN 623, and a third command may be generated to delete VLAN 624. After executing these commands, the configuration of the networking device 630 may be identical to the desired configuration 610. When the configuration is exhaustive, objects not defined in the desired configuration 610 may be deleted from the networking device 630. In the example given in FIG. 6, VLAN 624 is defined in the present configuration of the networking device 630, but not in the desired configuration 610. Therefore, when applying the exhaustive desired configuration 610 to the networking device 630, a delete command may be generated to delete the VLAN 624 from the networking device 630.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method comprising:
 receiving a desired configuration for networking devices;
 receiving a networking device filter;
 determining, based on the networking device filter, a plurality of target networking devices;
 determining a plurality of object schemas, each object schema of the plurality of object schemas corresponding to one networking device of the plurality of target networking devices;
 determining, based on the plurality of object schemas, a common schema comprising a plurality of rules that satisfy each of the plurality of object schemas, the plurality of rules being thereby applicable to each of the plurality of target networking devices;

comparing the common schema to the desired configuration to determine whether the desired configuration is valid for each of the plurality of target networking devices;

after determining that the desired configuration satisfies the common schema and is thereby valid for each of the plurality of target networking devices, comparing a present configuration of each of the plurality of target networking devices to the desired configuration;

generating a plurality of instructions for applying the desired configuration to each of the plurality of target networking devices; and causing the plurality of instructions to be executed, thereby applying the desired configuration to each of the plurality of target networking devices.

2. The method of claim 1, wherein determining the common schema comprises identifying attributes present in each object schema of the plurality of object schemas.

3. The method of claim 1, wherein comparing the common schema to the desired configuration comprises determining whether each configurable attribute of the desired configuration is valid according to the common schema.

4. The method of claim 1, wherein determining the plurality of target networking devices comprises:
determining, based on the networking device filter, one or more queries;
providing the one or more queries to a database; and
after providing the one or more queries, receiving an indication of the plurality of target networking devices.

5. The method of claim 1, wherein determining the plurality of target networking devices comprises searching for networking devices that satisfy one or more rules in the networking device filter.

6. The method of claim 1, wherein determining the plurality of object schemas comprises:
determining one or more classes corresponding to the plurality of target networking devices; and
generating, based on the one or more classes, the plurality of object schemas.

7. The method of claim 1, wherein causing the plurality of instructions to be executed comprises transmitting the plurality of instructions to a device, wherein the device is in communication with the plurality of target networking devices.

8. The method of claim 1, wherein generating the plurality of instructions comprises:
determining that a first instruction of the plurality of instructions comprises a reference to an object defined in a second instruction of the plurality of instructions; and
ordering the instructions so that the second instruction is executed before the first instruction.

9. The method of claim 1, further comprising:
determining whether the desired configuration is exhaustive;
after determining that the desired configuration is exhaustive, determining one or more objects defined in a present configuration of the networking devices, wherein the one or more objects are not defined in the desired configuration; and
generating one or more delete commands corresponding to the one or more objects.

10. The method of claim 1, further comprising:
determining whether a reference in the desired configuration is defined in the desired configuration or in a present configuration; and
after determining that the reference in the desired configuration is missing from the desired configuration and the present configuration, causing display of an error.

11. The method of claim 1, further comprising determining, for a networking device of the plurality of target networking devices, a driver corresponding to the networking device, and wherein generating the plurality of instructions comprises generating instructions for the networking device corresponding to the driver.

12. The method of claim 1, further comprising storing the plurality of instructions in a database.

13. The method of claim 1, further comprising transmitting one or more records to a database, wherein the one or more records indicate that the target networking devices have been configured according to the desired configuration.

14. An apparatus comprising:
at least one processor; and
a memory device comprising executable instructions, which, when executed by the at least one processor, cause the apparatus to perform:
receiving a desired configuration for networking devices;
receiving a networking device filter;
determining, based on the networking device filter, a plurality of target networking devices;
determining a plurality of object schemas, each object schema of the plurality of object schemas corresponding to one networking device of the plurality of target networking devices;
determining, based on the plurality of object schemas, a common schema comprising a plurality of rules that satisfy each of the plurality of object schemas, the plurality of rules being thereby applicable to each of the plurality of target networking devices;
comparing the common schema to the desired configuration to determine whether the desired configuration is valid for each of the plurality of target networking devices;
after determining that the desired configuration satisfies the common schema and is thereby valid for each of the plurality of target networking devices, comparing a present configuration of each of the plurality of target networking devices to the desired configuration;
generating a plurality of instructions for applying the desired configuration to the plurality of target networking devices; and
causing the plurality of instructions to be executed, thereby applying the desired configuration to the plurality of target networking devices.

15. The apparatus of claim 14, wherein determining the common schema comprises identifying attributes present in each object schema of the plurality of object schemas.

16. The apparatus of claim 14, wherein comparing the common schema to the desired configuration comprises determining whether each configurable attribute of the desired configuration is valid according to the common schema.

17. The apparatus of claim 14, wherein determining the plurality of target networking devices comprises:
determining, based on the networking device filter, one or more queries;
providing the one or more queries to a database; and
after providing the one or more queries, receiving an indication of the plurality of target networking devices.

18. The apparatus of claim 14, wherein determining the plurality of target networking devices comprises searching for networking devices that satisfy one or more rules in the networking device filter.

* * * * *